United States Patent
Lee et al.

(10) Patent No.: US 11,026,079 B2
(45) Date of Patent: Jun. 1, 2021

(54) METHOD AND DEVICE FOR MANAGING STATE OF SESSION ACCORDING TO POSITION OF TERMINAL IN WIRELESS COMMUNICATION SYSTEM

(71) Applicant: Samsung Electronics Co., Ltd., Gyeonggi-do (KR)

(72) Inventors: Jicheol Lee, Gyeonggi-do (KR); Beomsik Bae, Gyeonggi-do (KR); Jinsung Lee, Gyeonggi-do (KR); Kisuk Kweon, Gyeonggi-do (KR); Sangjun Moon, Seoul (KR); Jungshin Park, Seoul (KR); Hyungho Lee, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/496,783

(22) PCT Filed: Mar. 23, 2018

(86) PCT No.: PCT/KR2018/003441
§ 371 (c)(1),
(2) Date: Sep. 23, 2019

(87) PCT Pub. No.: WO2018/174638
PCT Pub. Date: Sep. 27, 2018

(65) Prior Publication Data
US 2020/0382941 A1    Dec. 3, 2020

(30) Foreign Application Priority Data

Mar. 23, 2017  (KR) .................. 10-2017-0037169

(51) Int. Cl.
*H04W 8/08*     (2009.01)
*H04W 76/27*    (2018.01)
(Continued)

(52) U.S. Cl.
CPC .......... *H04W 8/08* (2013.01); *H04W 28/065* (2013.01); *H04W 36/32* (2013.01); *H04W 48/04* (2013.01);
(Continued)

(58) Field of Classification Search
CPC ....... H04W 12/06; H04W 4/80; H04W 12/02; H04W 88/02; H04W 12/00508; H04W 12/001; H04W 12/08
See application file for complete search history.

(56) References Cited

U.S. PATENT DOCUMENTS

2008/0032695 A1    2/2008    Zhu et al.
2008/0233947 A1    9/2008    Herrero-Veron
(Continued)

FOREIGN PATENT DOCUMENTS

EP    3 490 333    5/2019

OTHER PUBLICATIONS

PCT/ISA/210 Search Report issued on PCT/KR2018/003441, pp. 5.
(Continued)

*Primary Examiner* — Kwasi Karikari
(74) *Attorney, Agent, or Firm* — The Farrell Law Firm, P.C.

(57) ABSTRACT

The present disclosure relates to a 5G or pre-5G communication system for supporting a data transmission rate higher than that of a 4G communication system such as LTE. According to one embodiment of the present invention, the present invention comprises the steps of: an access and mobility management function (AMF) of a 5G core network determining whether a terminal has moved to an area in which packet transmission/reception is possible, or an area in which packet transmission/reception is impossible; transmitting a message including information on the determina-
(Continued)

tion result to a session management function (SMF); and transmitting a response message including information associated with a change in the state of a session to the terminal. In addition, the present invention relates to a method and a device for blocking or allowing the transmission/reception of a packet transmission session (PDU session) according to the position of a terminal in a 5G system. In a 5G system, a local area data network service by which a packet session is valid only in a specific area will be supported, and a method is required for allowing the transmission of a packet of a session only in an area that can be divided into a cell or a tracking area. Additionally, in a 5G system, an allowed area in which the transmission/reception of a packet of a session according to each position of a terminal is allowed, and a non-allowed area in which same is not allowed are present, and thus packet transmission may be allowed or not according to area. In order to provide such service, the present invention provides a procedure whereby the state of a session is defined in a packet transmission non-allowed area, and a change in the state of the session occurs when moving from a packet transmission-allowed area to the non-allowed area.

12 Claims, 8 Drawing Sheets

(51) Int. Cl.
*H04W 28/06* (2009.01)
*H04W 36/32* (2009.01)
*H04W 48/04* (2009.01)
*H04W 60/00* (2009.01)
*H04W 84/04* (2009.01)

(52) U.S. Cl.
CPC ........... *H04W 60/00* (2013.01); *H04W 76/27* (2018.02); *H04W 84/042* (2013.01)

(56) References Cited

U.S. PATENT DOCUMENTS

| | | |
|---|---|---|
| 2011/0019644 A1 | 1/2011 | Cheon et al. |
| 2013/0208644 A1 | 8/2013 | Jung et al. |
| 2015/0237532 A1 | 8/2015 | Zhang |
| 2015/0245256 A1 | 8/2015 | Kiss |
| 2019/0182788 A1 | 6/2019 | Lee et al. |
| 2019/0200264 A1* | 6/2019 | Kim .................. H04W 36/0033 |

OTHER PUBLICATIONS

PCT/ISA/237 Written Opinion issued on PCT/KR2018/003441, pp. 7.
3GPP TR 23.799 V14.0.0, Dec. 16, 2016, 3rd Generation Partnership Project; Technical Specification Group Services and System Aspects; . . . Study on Architecture for Next Generation System (Release 14), pp. 524.
Samsung, "Session Management in a Mobility Restriction Area", S2-172242, SA WG2 Meeting #120, Mar. 27-31, 2017, 4 pages.
3rd Generation Partnership Project; Technical Specification Group Services and System Aspects; System Architecture for the 5G System; Stage 2 (Release 15), 3GPP TS 23.501 V0.3.1, Mar. 2017, 97 pages.
Samsung Elec., "23.502: Update of Registration Procedure Relating to PDU Session Status", S2-171901, SA WG2 Meeting #120, Mar. 27-31, 2017, 5 pages.
European Search Report dated Nov. 27, 2020 issued in counterpart application No. 18772026.3-1212, 13 pages.

* cited by examiner

METHOD AND DEVICE FOR MANAGING STATE OF SESSION ACCORDING TO POSITION OF TERMINAL IN WIRELESS COMMUNICATION SYSTEM

PRIORITY

This application is a National Phase Entry of PCT International Application No. PCT/KR2018/003441 which was filed on Mar. 23, 2018, and claims priority to Korean Patent Application No. 10-2017-0037169, which was filed on Mar. 23, 2017, the content of each of which is incorporated herein by reference.

TECHNICAL FIELD

The disclosure relates to a wireless communication system and, more particularly, to a method and device for managing a PDU session status according to a movement of a terminal in a cellular wireless communication system (5G system).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the 3GPP that is in charge of cellular mobile communication standardization has named a new core network structure as a 5G core (5GC) and is performing the standardization for a 5G system evolving from the existing 4G LTE system.

Compared to the evolved packet core (EPC) which is a network core for the existing 4G, the 5GC supports the following differentiated functions.

First, a network slice function is introduced in the 5GC. As 5G requirements, the 5GC should support various types of terminals and services such as, e.g., enhanced mobile broadband (eMBB), ultra-reliable low-latency communications (URLLC), and massive machine type communications (mMTC). These terminals/services have different requirements for the core network. For example, the eMBB service requires a high data rate, and the URLLC service requires high stability and low latency. A technique proposed to meet such various service requirements is a network slice scheme.

The network slice is a way to create multiple logical networks through virtualization of a single physical network. Each network slice instance (NSI) may have different characteristics. Therefore, when each NSI has a network function (NF) corresponding to the characteristics thereof, it is possible to satisfy various service requirements. Also, by allocating a suitable NSI for the characteristics of a required service to each terminal, it is possible to efficiently support various 5G services.

Second, the 5GC may realize an easy support for network virtualization paradigm by separating a mobility management function and a session management function. In the existing 4G LTE, all terminals were able to be provided with a service from the network through a signaling exchange with a single core device called a mobility management entity (MME) that performs registration, authentication, mobility management, and session management functions. However, in the 5G, because the number of terminals is explosively increased and the mobility and traffic/session characteristics to be supported according to a terminal type are divided, supporting all functions at a single device such as the MME may deteriorate the scalability for adding an entity by each required function. Therefore, in order to improve the complexity of function/implementation of core equipment being in charge of a control plane and also improve the scalability in terms of a signaling load, various functions are being developed on the basis of a structure that separates the mobility management function and the session management function.

DISCLOSURE OF INVENTION

Technical Problem

One object of the disclosure is to block packet transmission/reception of a terminal moved outside of an allowed area to achieve a service-specific purpose when a local area data network that allows the terminal to perform transmission/reception only in a specific area according to operator's setting information and service requirements is configured.

Another object of the disclosure is to minimize a signal between a terminal and a network when the terminal repeatedly moves between an area where packet transmission/reception is allowed and an area where it is not.

Still another object of the disclosure is to prevent packets from being repeatedly generated in a state where packet transmission/reception is blocked.

Solution to Problem

A method of a terminal according to the disclosure for solving the above problems include determining whether the terminal has moved to a packet transmission/reception allowed area or a packet transmission/reception non-allowed area, transmitting, to an access and mobility management function (AMF), a message containing information about a result of the determining, and receiving a response message including information on a session status changed based on the information on the result of the determination.

A method of an access and mobility management function (AMF) according to the disclosure for solving the above problems include determining whether a terminal has moved to a packet transmission/reception allowed area or a packet transmission/reception non-allowed area, transmitting, to a session management function (SMF), a message containing information for changing a session status according to a result of the determining, and receiving a response message including information on a change of the session status. The message for changing the session status may include information on whether the terminal is in the packet transmission/reception allowed area or the packet transmission/reception non-allowed area. Through this information, the SMF may determine whether to change the session status.

A method of a session management function (SMF) according to the disclosure for solving the above problems include receiving, from an access and mobility management function (AMF), a message for changing a session status in case that a terminal has moved to a packet transmission/reception allowed area or a packet transmission/reception non-allowed area, and changing the session status.

A terminal according to the disclosure for solving the above problems include a transceiver, and a controller configured to determine whether the terminal has moved to a packet transmission/reception allowed area or a packet transmission/reception non-allowed area, to transmit, to an access and mobility management function (AMF), a message containing information about a determining result, and to receive a response message including information on a session status changed based on the information on the result of the determination.

An access and mobility management function (AMF) according to the disclosure for solving the above problems include a transceiver, and a controller configured to determine whether a terminal has moved to a packet transmission/reception allowed area or a packet transmission/reception non-allowed area, to transmit, to a session management function (SMF), a message including information for changing a session status according to a result of the determination, and to receive a response message including information on a change of the session status.

A session management function (SMF) according to the disclosure for solving the above problems include a transceiver, and a controller configured to receive, from an access and mobility management function (AMF), a message for changing a session status in case that a terminal has moved to a packet transmission/reception allowed area or a packet transmission/reception non-allowed area, and to change the session status.

In addition, using information on a current cell and a tracking area in a cellular mobile communication system, it is possible to identify the location of the terminal and identify whether the terminal can transmit and receive a packet.

In an active state (CM-connected state in the 5G core network) of maintaining an RRC connection with an RAN, the terminal determines the mobility thereof through handover.

In an idle state where there is no RRC connection with the RAN, the terminal determines the mobility thereof by checking whether the tracking area is changed. The core network may determine whether the terminal has moved, through a registration update (location update) procedure performed by the terminal when changing the tracking area.

The network provides a packet transmission service to the terminal through creation and release of a PDU session with the terminal. When the terminal moves to the packet transmission/reception non-allowed area, the network may release the PDU session and thereby block packet transmission/reception.

Another method for blocking transmission/reception between the terminal and the network is to change the status of the PDU session to a packet transmission/reception unavailable state while maintaining the PDU session between the terminal and the network without release. When the status of the PDU session is a transmission/reception unreachable or unavailable state, the terminal may drop an uplink packet generated in the application layer and take an appropriate action to prevent the occurrence of an additional uplink packet. In addition, when the status of the PDU session is a transmission/reception unreachable or unavailable state, the network may drop a downlink packet and take an appropriate action to prevent an additional downlink packet from being generated.

Advantageous Effects of Invention

According to the disclosure, packet transmission/reception of a terminal can be blocked in an area where packet transmission/reception designated by an operator or desired by a service is not allowed.

According to the disclosure, an additional signal processing message is not generated when a terminal repeatedly moves to an area where packet transmission/reception is not allowed.

According to the disclosure, when changing a session status (PDU session status) in an area where packet transmission/reception is not allowed, a signal is transmitted to a sender transmitting a packet to prevent an additional packet from being generated.

MODE FOR THE INVENTION

Now, various embodiments of the disclosure are described in detail with reference to accompanying drawings. In the followings, detailed description of known functions and configurations incorporated herein will be omitted when it may make the subject matter of the disclosure rather unclear. The terms used herein are defined in consideration of functions disclosed herein, and they may be changed according to the intention of the user, the operator, or the like. Therefore, the definition should be made based on the contents throughout the disclosure. Hereinafter, a base station is an entity of performing resource allocation for a terminal and may be at least one of an eNode B, a Node B, a base station (BS), a radio access network (RAN), an access network (AN), a RAN node, a radio access unit, a base station controller, or a node on a network. A terminal may include a user equipment (UE), a mobile station (MS), a cellular phone, a smart phone, a computer, or a multimedia system capable of performing a communication function. In the disclosure, a downlink (DL) refers to a wireless transmission path of a signal transmitted to a terminal by a base station, and an uplink (UL) refers to a wireless transmission path of a signal transmitted to a base station by a terminal. Although embodiments of the disclosure will be described using an LTE or LTE-A system as an example, the embodiments may also be applied to other communication systems having a similar technical background or channel form. In addition, embodiments of the disclosure may be applied to other communication systems through partial modification by a person skilled in the art without departing from the scope of the disclosure.

Figure 1:
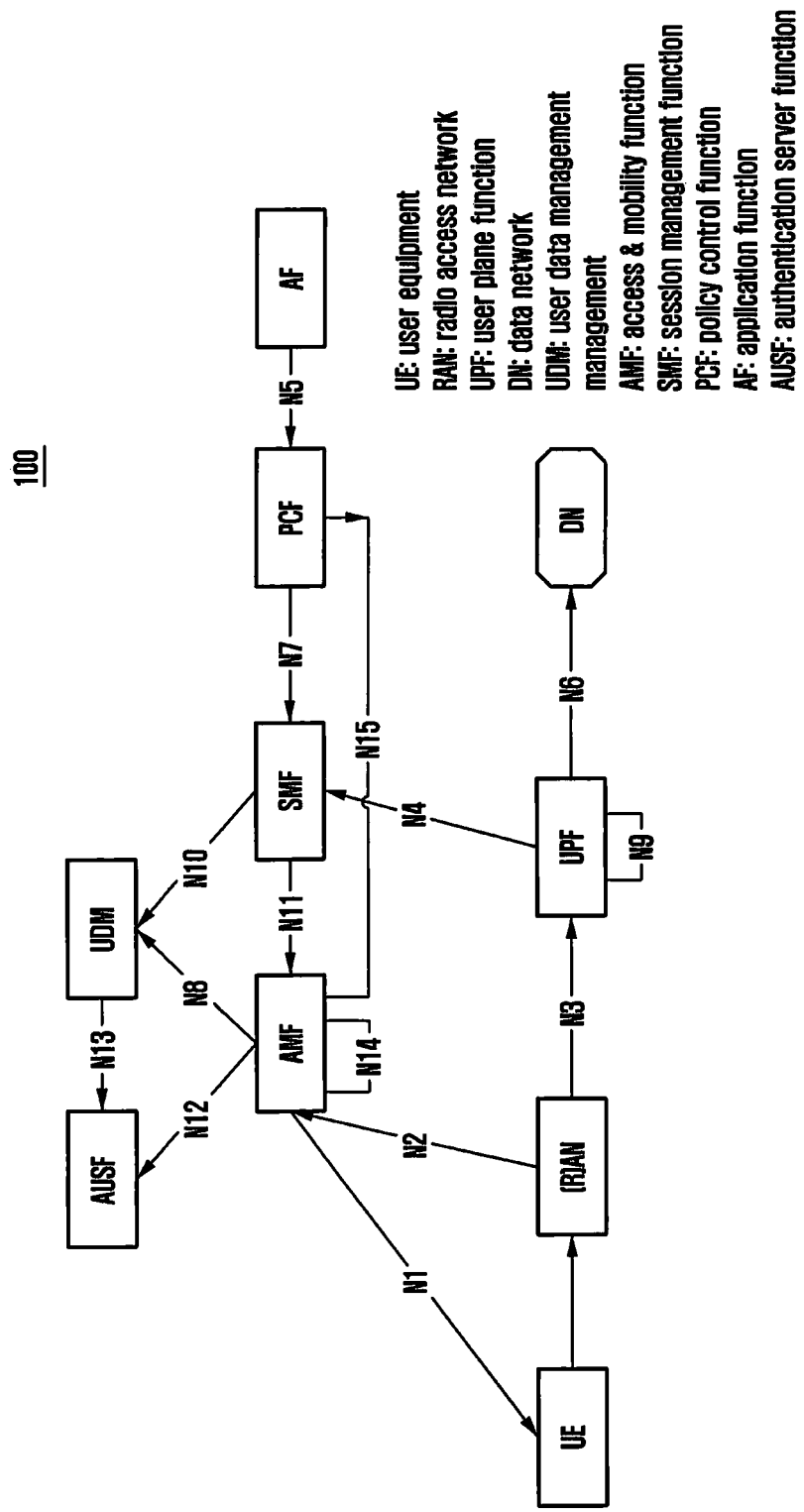
FIG. 1 is a diagram illustrating a network structure and interface of a 5G system.

FIG. 1 is a diagram illustrating a network architecture for a 5G system.

Referring to FIG. 1, in the network architecture for the 5G system, an access and mobility management function (AMF) for managing the mobility and network registration of a terminal (hereinafter, UE), and a session management function (SMF) for managing an end-to-end session may be separated. They may transmit and receive signaling through an N11 interface.

The 5G system may allocate an IP address or an IP prefix to the UE through the SMF for managing a session of the UE in a session connection process when the data network is an IP network which the terminal desires to access.

In addition, through a local area data network (LADN), the 5G system provides a data network function allowing the UE to be connected only when the UE is located in a specific area.

Restrictions based on UE locations (mobility restriction): The 5G system may separate, according to each UE location, a place where packet transmission and reception are allowed and a place where they are not allowed, and thereby provide a function of restricting or allowing the signal transmission and the packet transmission/reception according to the location.

In the disclosure, the operations of a network and UE in case of receiving a packet in a session unreachable state are defined as in the fourth embodiment, and a method of changing a session status when the UE moves from an area of allowing packet transmission/reception of a session to a non-allowed area is proposed.

When the UE moves from the packet transmission/reception allowed area to the non-allowed area, and when the UE explicitly transmits a message (e.g., a registration request) to the network <First embodiment>, the AMF responsible for the registration procedure and mobility procedure of the UE notifies a change in the UE location to the SMF responsible for the PDU session management (all matters related to session setup, session change, and session release). Then, when the UE is in the non-allowed area, the SMF changes the session status to a transmission/reception unreachable state.

When the UE moves from the packet transmission/reception-allowed area to the non-allowed area, and when the UE does not explicitly transmit the registration request, cases are divided depending on the mobility management state of the UE (i.e., active or idle) as will be described hereinafter.

When the UE moves from the packet transmission/reception allowed area to the non-allowed area in an idle state, the UE itself changes the session status thereof to the transmission/reception unreachable state by determining a transmission/reception unavailable area through packet transmission/reception allowed area information (LADN service area information in case of a local data network, and in case of mobility restriction, an area where transmission/reception is allowed may be an allowed area, and an area where transmission/reception is not allowed may be a non-allowed area) received in the previous registration procedure. That is, in case of the local data network, a place inside the LADN service area corresponds to the transmission/reception allowed area, and a place outside the LADN service area corresponds to the transmission/reception non-allowed area.

In this case, the network does not know whether the UE has moved to the packet transmission/reception non-allowed area. In this situation, if a downlink packet heading for the UE arrives, the AMF that receives a downlink data reception notification performs paging only in a corresponding area (i.e., service area). If the paging fails, the AMF may inform the SMF to change the session status to the transmission/reception unreachable state.

Meanwhile, when the UE moves from the packet transmission/reception allowed area to the non-allowed area in an active state, the UE determines a packet transmission/reception unavailable area after succeeding in a handover procedure and changes the session status to the transmission/reception unreachable state. In case of the network, the AMF determines during the handover procedure that the UE has moved to the non-allowed area, and instructs the SMF to change the state of the session.

Now, more detailed description will be given.

First Embodiment

The first embodiment relates to a UE operation method when the UE performs a registration update and moves from a packet transmission/reception allowed area to a packet transmission/reception non-allowed area. This method may also be equally applied to a case where the UE moves from the packet transmission/reception non-allowed area to the packet transmission/reception allowed area.

When the UE moves from the transmission/reception allowed area to the transmission/reception non-allowed area, the UE may transmit a registration request to the AMF through the base station (hereinafter, RAN) (steps 1 and 2). That is, through information on the transmission/reception allowed and non-allowed areas received in the initial registration or registration update process and information (cell id or tracking area index) from the base station in the transmission/reception non-allowed area, the UE may determine that it has moved to the transmission/reception non-allowed area for a packet data session.

When the UE performs the initial registration, when the UE moves between registration areas, when the UE moves from the transmission/reception non-allowed area to the transmission/reception allowed area, or when the UE moves to a transmission/reception available area (i.e., the transmission/reception allowed area) to a transmission/reception unavailable area (i.e., the transmission/reception non-allowed area), the UE may send a registration request message to the AMF to notify the AMF that the UE has moved to another registration area or has moved from the transmission/reception allowed area to the transmission/reception non-allowed area. At this time, for notification, the UE may insert information indicating a movement to the transmission/reception non-allowed area in the registration request message.

Therefore, after determining that the UE has moved from the transmission/reception allowed area to the transmission/reception non-allowed area, the AMF determines whether a corresponding session allows or not transmission/reception for the current location of the UE, and then forwards to the SMF a message containing information on whether the UE is in the transmission/reception allowed area or in the transmission/reception non-allowed area, so as to change a session status from an available state to an unavailable or unreachable state. In this case, the information on whether the UE is in the transmission/reception allowed area or the transmission/reception non-allowed area is selectively forwarded to only the SMF managing a session in which transmission/reception is not allowed, as in case of the local area data network. The information on whether the UE is in the transmission/reception allowed area or the transmission/reception non-allowed area may be defined as IN when the UE is in the transmission/reception allowed area, as OUT when the UE is in the transmission/reception non-allowed area, or as UNKNOWN when it is not possible to determine whether or not the UE is in the transmission/reception allowed area. If the AMF changes the status of all sessions except for an operator-designated service such as an emergency service of the UE through the SMF, the AMF forwards to the SMF the information indicating that the UE has moved to the transmission/reception non-allowed area, in order to change the status of the corresponding session. Also, the AMF may insert, in the mobility restriction to be sent to the SMF, the information indicating that the UE has moved to the transmission/reception non-allowed area.

When the UE moves from the transmission/reception non-allowed area to the transmission/reception allowed area, the UE determines that the registration area (RA) has changed, and transmits the registration request to the AMF through the RAN (steps 1 and 2). The AMF determines whether the UE has moved from the transmission/reception non-allowed area to the transmission/reception allowed area. For a session in a transmission/reception unreachable state, the AMF determines that the session of the UE is in the transmission/reception non-allowed area, by checking location information (e.g., tracking area code) of the UE and subscription information of the UE received using a user data management or a policy control function (PCF). The AMF forwards, to the SMF that manages a transmission/reception unavailable session at the current location of the UE, the current location information of the UE or an indicator indicating that the UE is in the transmission/reception non-allowed area for a corresponding session (i.e., an indicator indicating whether or not the UE is in a transmission/reception allowed location), thereby enabling the SMF to change the session status to the transmission/reception available or unavailable state. The details will be described with reference to FIG. 2.

Figure 2:
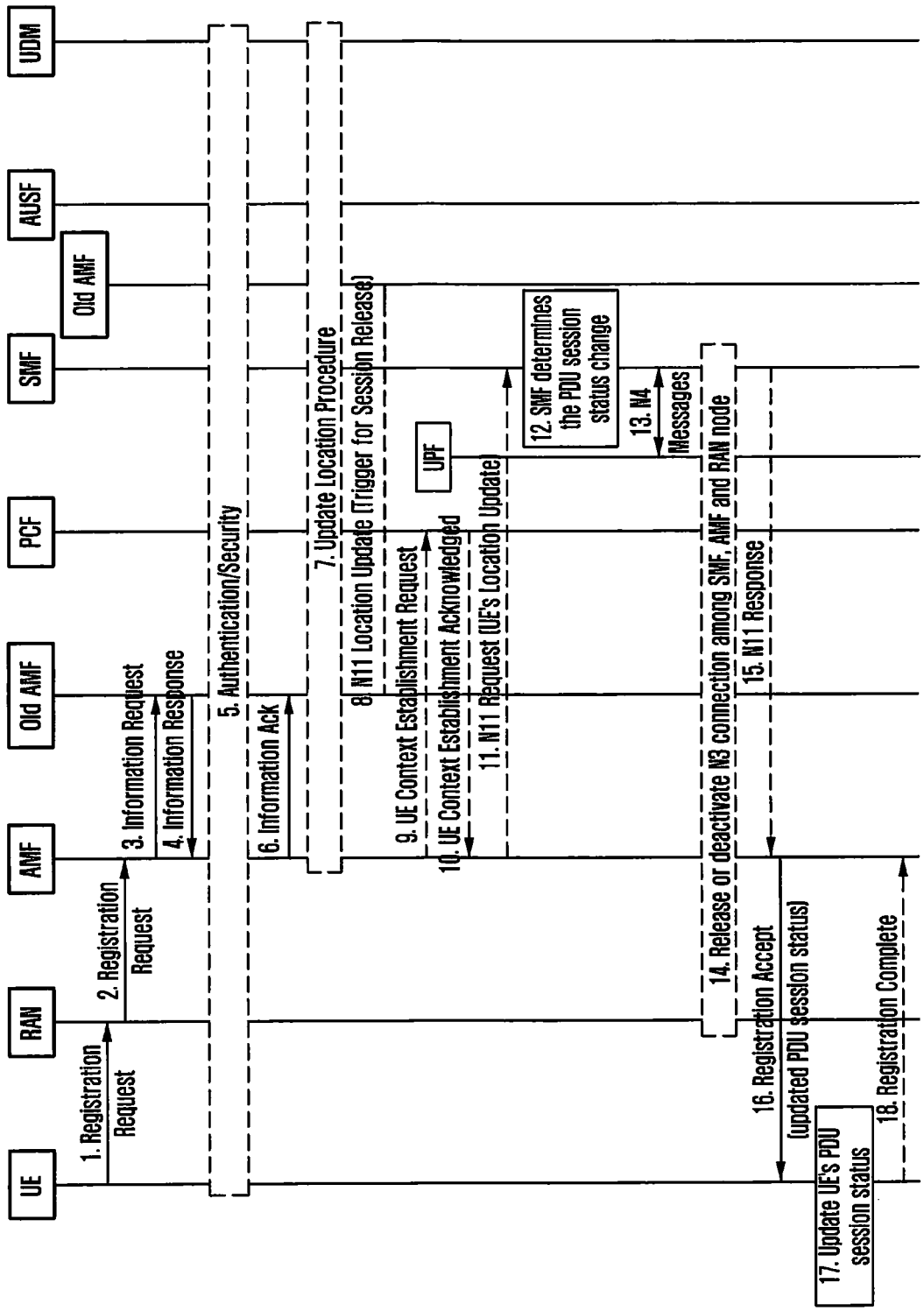
FIG. 2 is a diagram illustrating a procedure of changing a session status when a terminal performs a registration update while moving from a packet transmission/reception allowed area to a non-allowed area according to the first embodiment.

FIG. 2 is a diagram illustrating a procedure of changing a session status when a terminal performs a registration update while moving from a packet transmission/reception allowed area to a non-allowed area according to the first embodiment.

The procedure 200 according to the first embodiment will be described with reference to FIG. 2. As described above, at steps 1 and 2, the terminal (hereinafter, UE) may forward a registration request message to the AMF through the base station (hereinafter, RAN).

In addition, at steps 3 to 6, the UE may transmit an information request message (information request), receive a response message (information response), and perform an authentication procedure (authentication/security). Then, a location update procedure of step 7, an N11 location update (trigger for session release) of step 8, a UE context establishment request of step 9, and a UE context establishment acknowledged of step 10 may be performed.

At step 11, the AMF may transmit, to the SMF, UE location information (tracking area index) or corresponding information, an indicator indicating that the UE is out of the packet transmission/reception area (information on whether the UE is in the transmission/reception allowed area or in the non-allowed area), or UE-belonging area information.

Therefore, at step 12, the SMF receiving such information determines that the UE has been out of the packet transmission/reception allowed area, and performs a corresponding operation. That is, the SMF releases a corresponding PDU session, deactivates the PDU session, or transitions the session status to the transmission/reception unreachable state as will be described in the fourth embodiment (SMF determines the PDU session status change).

In addition, at step 13, the SMF may transmit and receive an N4 message to and from the UPF.

If the SMF determines the release or deactivation of an N3 session, the SMF performs step 14 to release an N3 connection (Release or deactivate N3 connection among SMF, AMF, and RAN node).

Then, at step 15, the SMF may forward the changed session status to the AMF. The SMF may insert the changed session status in a response message (N11 response) corresponding to the request message (N11 request) received at step 11. Also, the AMF stores the changed session status.

Thereafter, at step 16, the AMF may transmit a registration update response (registration accept) message to the UE. The AMF may insert session status information (PDU session status) in the registration update response, and the session status information may indicate a changed session status for each session. For example, the status of a session (PDU session) may be changed from an established state to a release state due to the movement of the UE. At this time, the session status information may contain an indicator explicitly indicating the release of the session.

If the session status supports optional UP activation and deactivation, the session status information may contain an indicator indicating that the session status has changed to a deactivated state. Or, the session status information may contain an indicator indicating that the session status has changed from a transmission/reception reachable state to a transmission/reception unreachable state.

Therefore, the UE may update the session status according to the session status information at step 17, and transmit a registration completion message to the AMF at step 18.

Second Embodiment

The second embodiment relates to a UE operation method when the UE moves, in an idle state, from a packet transmission/reception allowed area to a packet transmission/reception non-allowed area without performing a registration update.

This method may also be equally applied to a case where the UE moves from the packet transmission/reception non-allowed area to the packet transmission/reception allowed area.

When the UE moves, in the idle state, from the packet transmission/reception allowed area to the packet transmission/reception non-allowed area, the UE recognizes the packet transmission/reception non-allowed area for a specific packet session through LADN service area information received in the registration process.

Also, the UE determines the packet transmission/reception non-allowed area through mobility restriction information (indicating the allowed area and the non-allowed area) received in the registration process.

Thus, the UE itself changes the session status in the transmission/reception non-allowed area to a transmission/reception unreachable or unavailable state. The transmission/reception unreachable or unavailable state will be described in the fourth embodiment.

Because the network does not perform the registration update procedure even when the UE moves from the transmission/reception allowed area to the transmission/reception non-allowed area in the idle state, the session status may be the transmission/reception reachable state. In this case, the reachable state is the opposite of the unreachable state and may mean a state in which paging should be performed upon arrival of a downlink packet.

When a downlink packet arrives at a user plane function (UPF), the UPF may transmit a downlink data notification to the SMF.

The SMF forwards the downlink data notification (DDN) message to the AMF. At this time, the DDN message may contain a UE ID and a session identifier (i.e., PDU session ID) in the UE.

The AMF may identify the UE ID and the PDU session ID, and determine a paging area corresponding to the PDU session. Then, the AMF performs a paging procedure to a corresponding base station (RAN).

If there is no paging response for a predetermined time, the AMF changes the session status to the transmission/reception unreachable state. Also, the AMF notifies the SMF that paging has failed. The SMF receives a paging failure notification and changes the PDU session status to the transmission/reception unreachable state. The details will be described with reference to FIG. 3.

Figure 3:
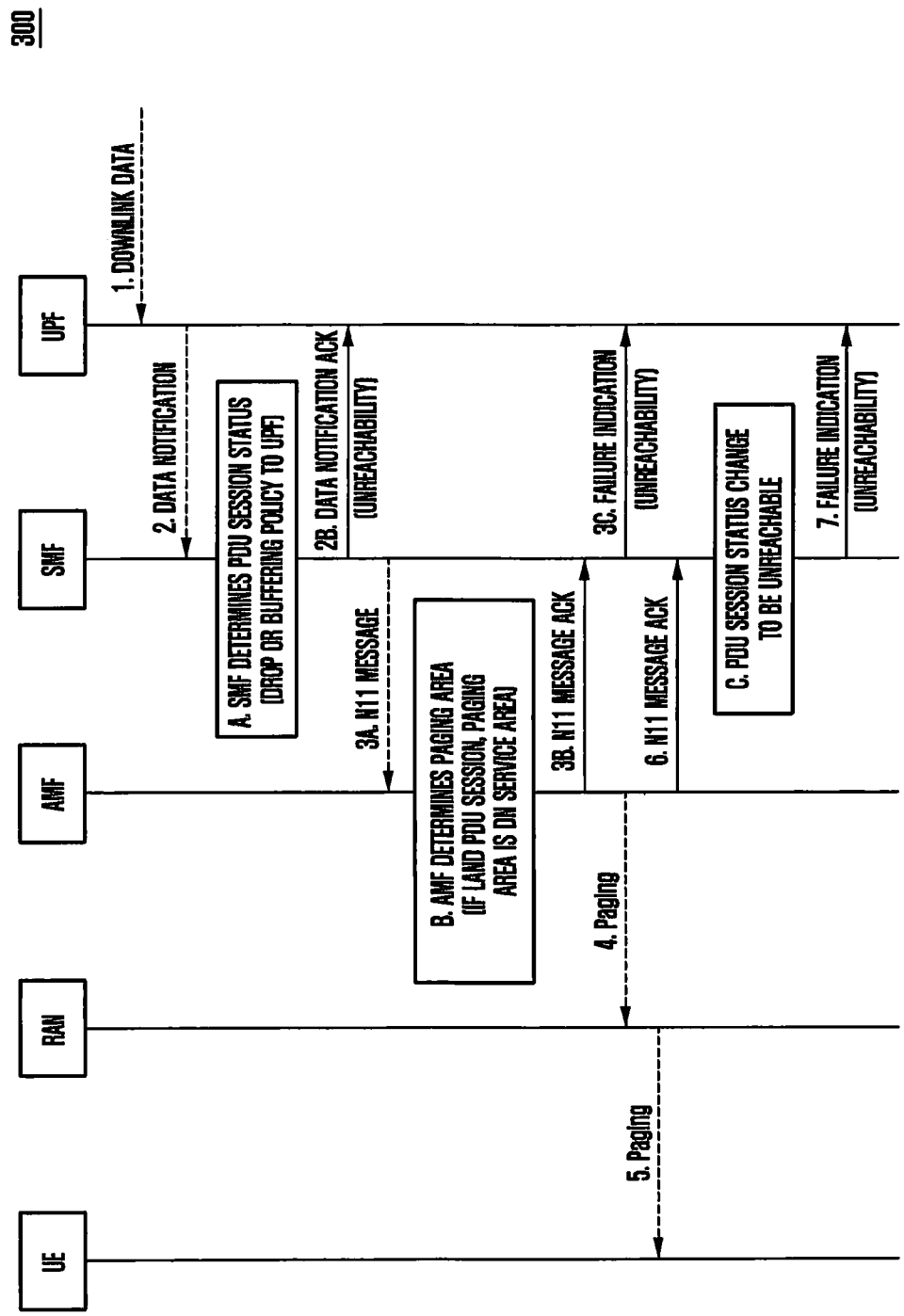
FIG. 3 is a diagram illustrating a procedure of changing a session status when a terminal, in an idle state, receives a downlink packet after moving from a packet transmission/reception allowed area to a non-allowed area according to the second embodiment.

FIG. 3 shows the operation in case where the UE remains in the packet transmission/reception non-allowed area, the status of a session managed by the SMF is not the transmission/reception unreachable state (i.e., active or deactivated), and a downlink data packet is received.

Referring to FIG. 3, at step 1 in the procedure 300, the UPF may receive downlink data. Then, at step 2a, the UPF may forward a data reception notification (data notification) to the SMF.

Thus, the SMF receives the data reception notification from the UPF and determines the PDU session status at step A. In addition, considering a local policy, the SMF determines whether to enable or disable a downlink data notification upon downlink reception. In case of disabling the downlink data notification, the SMF instructs the UPF to drop a packet.

If the status of a session managed by the SMF is already the transmission/reception unreachable state, the SMF transmits a response to the data reception notification (data notification ACK) to the UPF at step 2b so as to inform a packet processing policy of the transmission/reception blocked session. The packet processing policy includes information on whether a received packet is dropped, and information on whether a control message such as an Internet control message protocol (ICMP) is forwarded to a sender of the received packet. Alternatively, the SMF may directly generate an ICMP message and forward it to the packet sender via the UPF.

When receiving the ICMP control message from the SMF, the UPF forwards a control message, such as ICMP destination unreachable, to the packet sender not to send a packet any more.

Meanwhile, at step 3a, the SMF may transmit an N11 message to the AMF. The N11 message refers to a message transmitted through N11 signaling, and it is obvious that the name of the message may vary.

Thus, the AMF receives the N11 message from the SMF and determines a paging area for a corresponding session. If the session is a local area data network, the AMF may determine the paging area at step B by using information on the packet transmission/reception allowed area (LADN service area) which has been set in the AMF.

Then, at step 4, the AMF performs a paging procedure. If the UE is not located in the packet allowed area, a paging failure will occur. In this case, the AMF notifies the paging failure to the SMF (step 6, N11 message ACK).

The SMF receiving the paging failure notification may change the PDU session status to the transmission/reception unreachable state at Step C. Then, the SMF may notify the session failure to the UPF at step 7. In this case, as shown at step 2b, the SMF may transmit a message indicating whether the packet is dropped and causing the transmission of a control message (e.g., ICMP) to a packet sender.

Third Embodiment

The third embodiment relates to a UE operation method when the UE moves, in an active (CM-connected) state, from a packet transmission/reception allowed area to a packet transmission/reception non-allowed area without performing a registration update.

The network determines that the UE has moved to a transmission/reception unavailable cell or a target base station (i.e., target RAN) providing a tracking area in a handover procedure. That is, the AMF determines that the UE has moved to the transmission/reception non-allowed area during the handover procedure. The AMF identifies a transmission/reception unavailable session in that area and transmits, to the SMF, location information of the UE or an indicator indicating that the UE has moved to the transmission/reception non-allowed area. The SMF receives this message and changes the session status to a packet transmission/reception unreachable or unavailable state. In addition, the SMF may perform a selective deactivation procedure of a PDU session including a procedure of releasing an N3 tunnel for transmitting and receiving a packet (protocol data unit) to and from the base station (RAN).

The UE determines the packet transmission/reception non-allowed area after the success of the handover procedure. Then, the UE changes the session status to the unreachable (unavailable) state. The details will be described with reference to FIG. 4.

Figure 4:
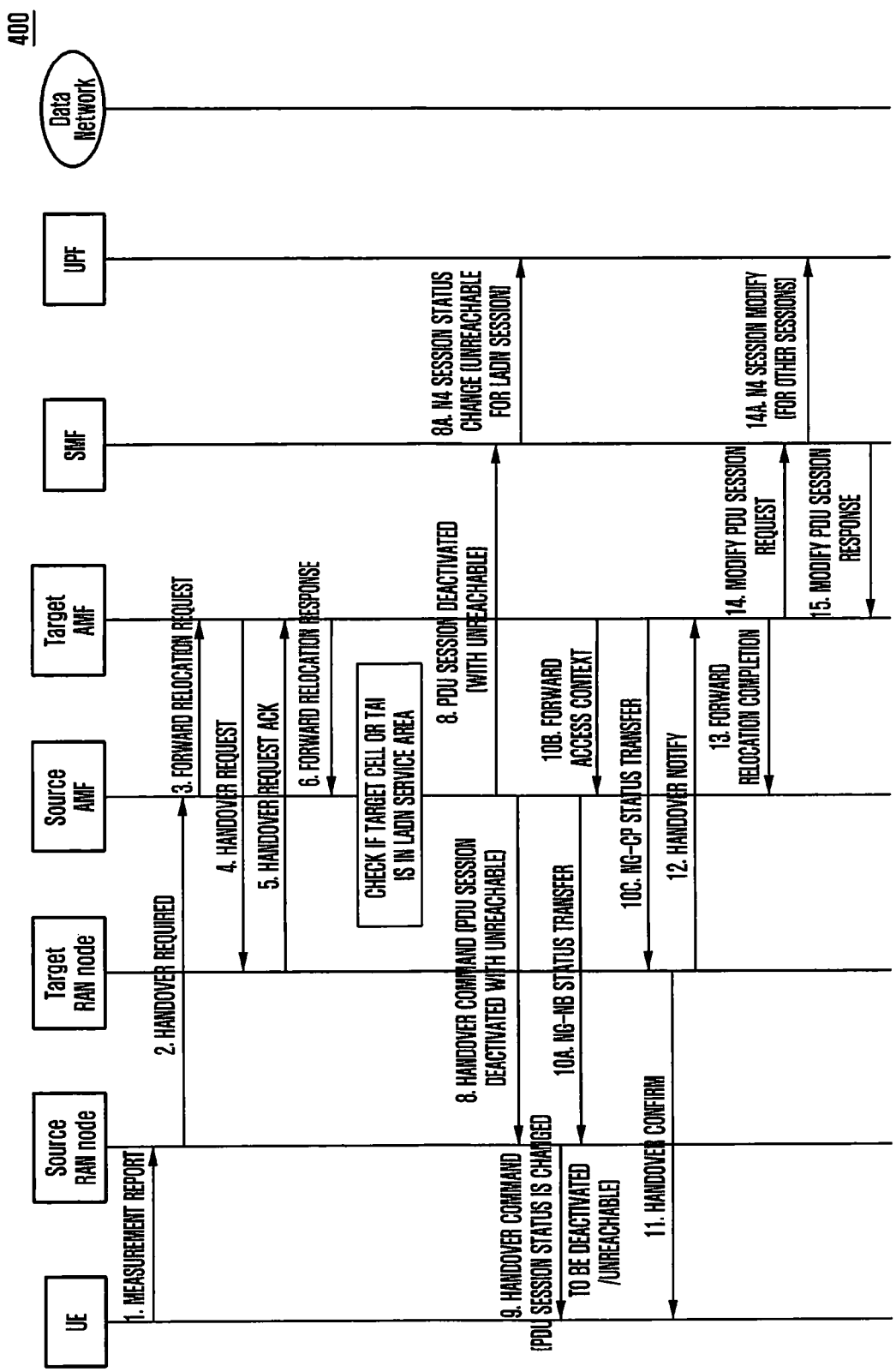
FIG. 4 is a diagram illustrating a procedure of changing a session status when a terminal, in an active state, moves from a packet transmission/reception allowed area to a non-allowed area according to the third embodiment.

FIG. 4 is a diagram illustrating a procedure of changing a session status when a terminal, in an active state, moves from a packet transmission/reception allowed area to a non-allowed area according to the third embodiment.

Referring to FIG. 4, a handover procedure may be performed according to the movement of the terminal (hereinafter, UE). The description of the handover procedure (steps 1 to 6) is omitted.

At step 7, a source AMF may check whether a target cell for the handover of the UE is located in the packet transmission/reception non-allowed area. An LADN service area described at step 7 of FIG. 4 refers to information preconfigured in the AMF, and is composed of LADN delimiter information and LADN service area information. The LADN service area information may be a tracking area list or a cell list. Therefore, the source AMF may check if the target cell or TAI is in the LADN service area.

When detecting that the UE moves to the packet transmission/reception allowed area to the packet transmission/reception non-allowed area, the source AMF transmits a message for changing the status of a session disallowing packet transmission/reception due to the handover to the SMF at step 8. Then, at step 8*a*, the SMF may transmit to the UPF an N4 session status change message containing information indicating that transmission/reception is blocked for the LADN session (N4 session status change (unreachable for the LADN session)).

In addition, when the session status is deactivated, the AMF transmits a handover command to a base station at step 8 to remove an N3 tunnel of the RAN. Also, when the session status is changed to the transmission/reception unreachable state, the source RAN node may explicitly transmit the change of the session status to the UE through the handover command at step 9. The PDU session status information transmitted to the UE may contain an indicator indicating that the status of a session established due to the movement of the UE has changed to a released state, indicating that the session status has changed to a deactivated state when the session status selectively supports activation and deactivation, or indicating that the session status has changed from a transmission/reception reachable state to a transmission/reception unreachable state. That is, the network including RAN nodes is capable of notifying through the session status information that the session status has changed to the released state, the deactivated state, or the transmission/reception unreachable state.

In addition, at step 10*a*, the source AMF may transmit an NG-NB status transfer message to the source RAN node. Also, a target AMF may transmit a forward access context message to the source AMF at step 10*b*, and transmit an NG-CP status transfer message to a target RAN node at step 10*c*. Then, the target RAN node and the target AMF will perform a subsequent handover procedure, and a detailed description thereof will be omitted.

Fourth Embodiment

In the fourth embodiment, the operation regarding the transmission/reception unreachable state (the PDU session unreachable state) will be described.

In the disclosure, the transmission/reception unreachable state, the transmission/reception blocked state, the transmission/reception non-allowed state, and the PDU session unreachable or unavailable state are used to mean the same status, i.e., the status of a session in the packet transmission/reception non-allowed area.

In the transmission/reception unreachable state of the session, the operations of the UE is as follows.

When an uplink packet is generated from the application layer in the idle state, the UE checks the status of a PDU session for corresponding traffic.

If the session status is the transmission/reception unreachable state, and if the UE is in the idle (CM-IDLE) state, the UE does not send a service request which is a signal transmitted to the network so as to transition the idle state of the UE to the active state.

The UE performs an operation of dropping the uplink packet irrespective of whether a mobility management state (idle or active state) of the UE is the idle state or the active state (CM-connected state).

The UE performs a procedure to prevent the application layer from transmitting an additional packet. For example, the UE may perform an operation of downing a network interface or transmit an ICMP control message to the application layer.

When a packet is received in the transmission/reception unreachable state of the session, the operations of the network is as follows.

When a downlink packet arrives at the UPF from the SMF, the UPF transmits a downlink data notification to the SMF.

When receiving the packet in the transmission/reception unreachable state, the SMF performs a predetermined operation according to an operator policy, such as buffering or dropping the packet.

In case of dropping the packet, an appropriate action may be taken to prevent retransmission of additional packets. For example, the UPF may transmit an ICMP message (e.g., ICMP destination unreachable/destination host unreachable (Type=3, Core 2)) to a packet sender so as to prevent further packet transmission.

Fifth Embodiment

The fifth embodiment relates to a method for a terminal (UE) to determine a transmission/reception non-allowed area.

Described above is a method for blocking transmission/reception of a session when the UE moves from the transmission/reception allowed (available) area to the transmission/reception non-allowed (unavailable) area. Thus, in the fifth embodiment, a procedure for the UE to determine the transmission/reception non-allowed area will be described.

The UE performs registration in the 5G core network through a registration procedure.

The registration procedure includes an initial registration procedure performed by the UE at the initial access in a state where the UE is not registered in the system (RM-unregistered state), a periodic registration procedure performed by the UE to maintain the transmission/reception reachable state (reachability), and a mobility registration procedure performed by the UE being out of a tracking area to notify mobility.

When performing this registration procedure, the UE receives information on a transmission/reception available area or a transmission/reception unavailable area from the network (AMF). The UE receives, in the form of a cell list or a tracking area list, location information (e.g., local data network information) about an area allowing transmission/reception for each session of the UE. Also, the UE receives information about the transmission/reception available area and the transmission/reception unavailable area for all sessions of the UE in the names of the allowed area and the non-allowed area.

Through both the above-received information and the system information received by the UE to connect to a base station (RAN), the UE may know a current cell and a tracking area. Using this, the UE may identify whether transmission/reception is blocked for all current sessions of the UE and whether transmission/reception is blocked for each session.

Figure 5:
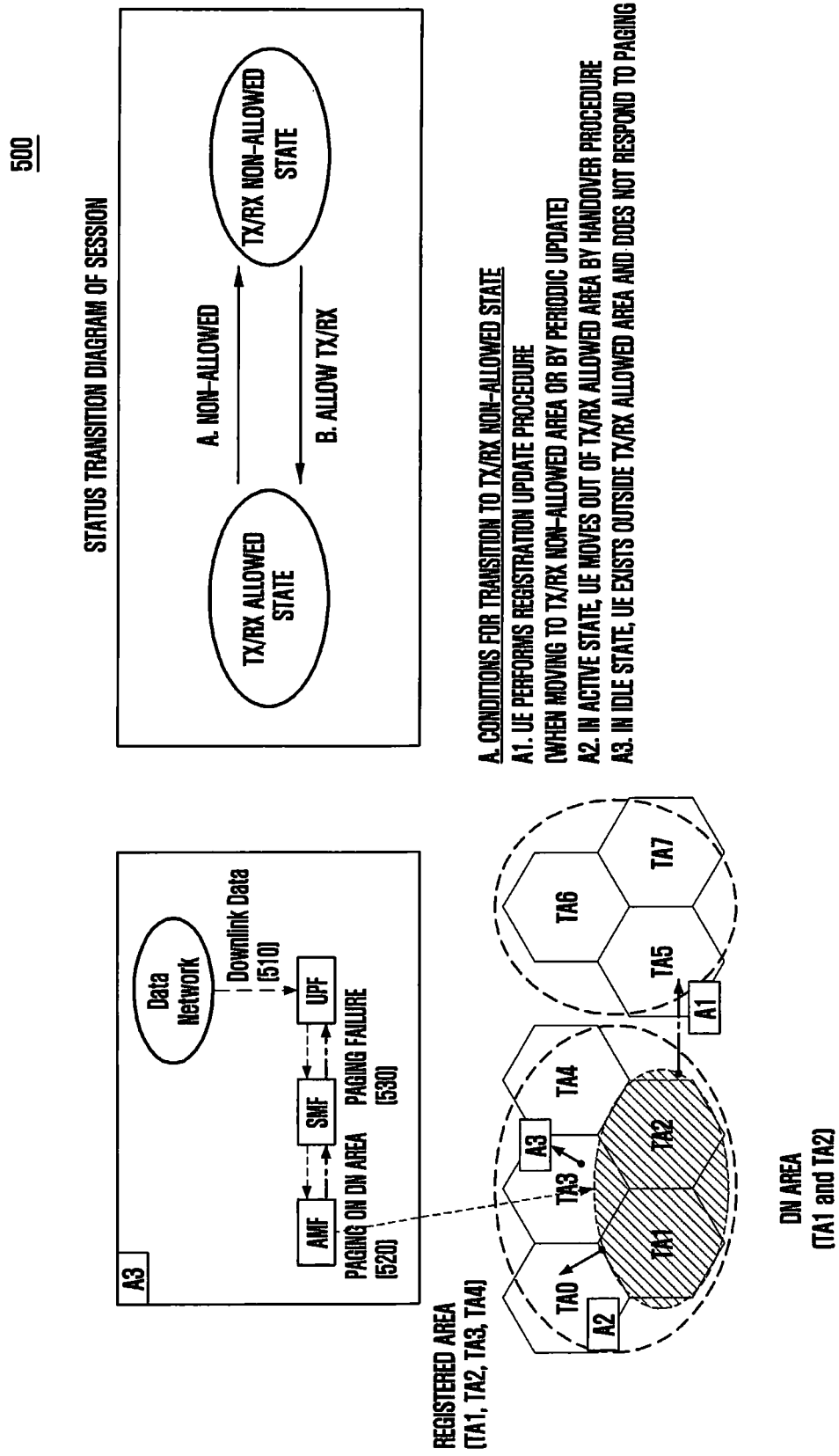
FIG. 5 is a diagram illustrating a session status change of a terminal.

FIG. 5 is a diagram illustrating a session status change of a terminal.

Referring to FIG. 5, when any one of the following three conditions is satisfied, the session status of the UE can be changed to the transmission/reception blocked (unreachable or unavailable) state.

1. While performing a registration update procedure, the UE can notify the AMF that the UE moves to the transmission/reception non-allowed area or the transmission/reception allowed area. Therefore, when the UE moves to the transmission/reception non-allowed area, the session status of the UE may be changed to the transmission/reception blocked state (First Embodiment).

Referring to FIG. 5, the UE can perform the registration update procedure when the tracking area is changed due to the UE movement. When the UE moves as indicated by A1, the tracking area is changed, and the UE may transmit a registration update message to the AMF. In this case, through registration update message, the UE may notify the AMF that the UE moves to the transmission/reception non-allowed area. Therefore, the AMF may notify the location change of the UE to the SMF, so that the SMF may change the session status.

2. When the UE moves to the transmission/reception non-allowed area through the handover procedure in the active state, the session status of the UE may be changed to the transmission/reception blocked state (Third Embodiment).

Referring to FIG. 5, during a handover procedure, the UE may perform a handover to the transmission/reception non-allowed area. When the UE hands over to the transmission/reception non-allowed area TA0 as indicated by A2, the AME may detect that the UE has moved to the packet transmission/reception non-allowed area. Therefore, the AMF may forward a message for changing the session status to the SMF, so that the SMF may change the session status.

3. When the UE is located outside the transmission/reception allowed area in the idle state and there is no response to paging, the session status of the UE may be changed to the transmission/reception blocked state. Therefore, the AMF may check whether a target cell to which the UE hands over is in the transmission/reception non-allowed area.

Referring to FIG. 5, because the UE does not perform the registration update procedure even when moving to the transmission/reception non-allowed area in the idle state as indicated by A3, the session status may be the transmission/reception available state.

Therefore, when a downlink packet arrives at the UPF as indicated by 510, the UPF may transmit a downlink data reception notification to the SMF, and the SMF may transmit the downlink data reception notification to the AMF.

Thus, the AMF may determine a paging area and perform a paging procedure. At this time, the AMF transmits a paging message to an LADN service area as indicated by 520. However, because the UE moves and is then located in the transmission/reception non-allowed area TA3, the paging fails.

Therefore, the AMF may transmit a paging failure notification 530 to the SMF, so that the SMF may change the session status.

Figure 6:
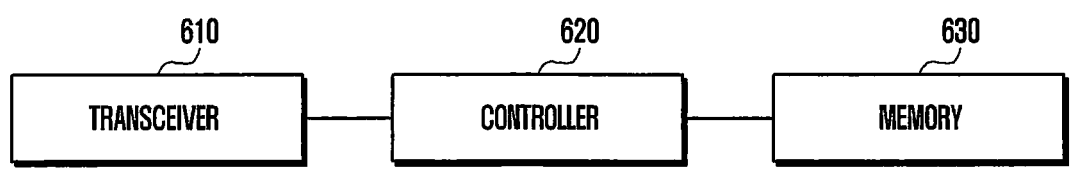
FIG. 6 is a diagram illustrating a configuration of a terminal according to an embodiment of the disclosure.

FIG. 6 is a diagram illustrating a configuration of a terminal according to an embodiment of the disclosure.

Referring to FIG. 6, the terminal (UE) may include a transceiver 610, a controller 620, and a storage 630.

The transceiver 610 may transmit/receive a signal to/from a base station (RAN) and other network entities, and thus include a communication interface. For example, the transceiver 610 may transmit a registration update message to the AMF through the base station, and receive a response message.

The controller 620 may control the overall operations of the terminal and particularly control the terminal to perform the above-described operations of embodiments. For example, the controller 620 may control a signal flow between blocks to perform the above-described operation of flowchart. In addition, the controller 620 may include at least one processor. The processor may be controlled by a program that includes instructions to perform the methods described in embodiments of the disclosure. The program may be stored in a storage medium, which may include volatile or nonvolatile memory. Such memory may be a medium capable of storing data and is not limited to a specific form as long as it can store the instructions.

Specifically, the controller 620 may determine whether the terminal has moved from the packet transmission/reception allowed area to the non-allowed area. The controller 620 may receive information on the transmission/reception allowed area or the transmission/reception non-allowed area from the network (AMF). The controller 620 receives, in the form of a cell list or a tracking area list, location information on the transmission/reception allowed area for each session of the terminal. Also, the controller 620 receives information on the transmission/reception allowed area and the transmission/reception non-allowed area for all session of the terminal in the names of the allowed area and the non-allowed area. Through both the above-received information and the system information received by the terminal to connect to the base station, the controller 620 may know a current cell and a tracking area. Therefore, the controller 620 may determine whether the terminal has moved from the packet transmission/reception allowed area to the non-allowed area, and may also identify whether transmission/reception is blocked for all current sessions of the terminal and whether transmission/reception is blocked for each session. However, embodiments of the disclosure are not limited to this, and the controller 620 may also determine whether the terminal has moved from the packet transmission/reception non-allowed area to the packet transmission/reception allowed area.

Thus, when the terminal has moves to the packet transmission/reception non-allowed area, the controller 620 may notify this movement to the AMF. Using the registration update request message or the mobility registration procedure, the controller 620 may notify the AMF that the terminal has moves to the packet transmission/reception non-allowed area.

In addition, the SMF may change the session status of the terminal. That is, based on the above determination result, the session status of the terminal may be changed.

Besides, the controller 620 may control all operations of the terminal described in the disclosure.

The storage 630 may store information transmitted or received by the terminal and information generated by the controller 620 according to embodiments of the disclosure. For example, the storage 630 may store location information transmitted or received for each session. Also, the storage 630 may store information on the current cell and the tracking area identified through the system information.

Figure 7:
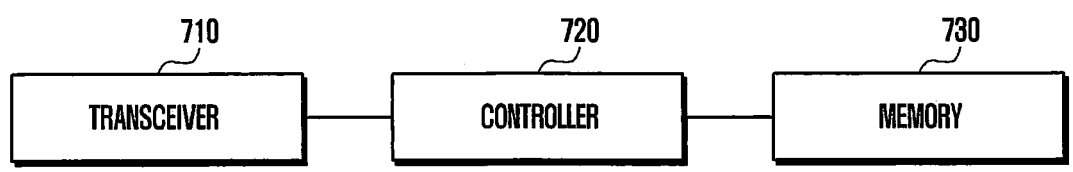
FIG. 7 is a diagram illustrating a configuration of an AMF according to an embodiment of the disclosure.

FIG. 7 is a diagram illustrating a configuration of an AMF according to an embodiment of the disclosure.

Referring to FIG. 7, the AMF may include a transceiver 710, a controller 720, and a storage 730.

The transceiver 710 may transmit/receive a signal to/from a terminal (UE), a base station (RAN), and other network entities, and include a communication interface. For example, the transceiver 710 may receive a registration update message from the terminal through the base station, and transmit a response message. Also, the transceiver 710 may transmit to the SMF a message indicating that the terminal is out of the packet transmission/reception allowed area.

The controller 720 may control the overall operations of the AMF and particularly control the AMF to perform the above-described operations of embodiments. For example, the controller 720 may control a signal flow between blocks to perform the above-described operation of flowchart. In addition, the controller 720 may include at least one processor. The processor may be controlled by a program that includes instructions to perform the methods described in embodiments of the disclosure. The program may be stored in a storage medium, which may include volatile or non-volatile memory. Such memory may be a medium capable of storing data and is not limited to a specific form as long as it can store the instructions.

Specifically, the controller 720 may determine whether the terminal has moved from the packet transmission/reception allowed area to the non-allowed area. Through the registration update message received from the terminal, or using the location information of the terminal and the location information on the transmission/reception allowed area, the controller 720 may identify or determine whether the terminal has moved. Also, the controller 720 may control transmitting, to the SMF, information about an area to which the terminal belongs, or an indicator indicating that the terminal is out of the packet transmission/reception allowed area. That is, the controller 720 may transmit a message for changing the session status to the SMF.

Therefore, the session status may be changed. When the terminal has moved to the packet transmission/reception non-allowed area, the session status may be changed to at least one of the released state, the deactivated state, or the transmission/reception unreachable state with the session maintained.

Thus, the controller 720 may control receiving and storing the changed session status and also control transmitting information on the changed session status to the terminal. At this time, the information on the changed session status may contain an identifier indicating the changed session status for each session.

In addition, when the terminal is in the idle state, the controller 720 may receive a data reception notification from the SMF and then determine a paging area for the session of the terminal. Using information on the packet transmission/reception allowed area, the controller 720 may determine the paging area.

Also, the controller 720 may performing the paging. If the paging fails, the controller 720 may notify a paging failure to the SMF, and thereby the SMF may change the session status.

Besides, the controller 720 may control all operations of the AMF described in the disclosure.

The storage 730 may store information transmitted or received by the AMF and information generated by the controller 720 according to embodiments of the disclosure. For example, the storage 730 may store location information transmitted or received for each session. Also, the storage 730 may store information on the packet transmission/reception allowed area. And also, the storage 730 may store information on the changed session status for each session.

Although the disclosure is described using a case where the terminal moves to the packet transmission/reception non-allowed area, embodiments of the disclosure are not limited to the described case. The controller 720 may also similarly operate in another case where the terminal moves from the packet transmission/reception non-allowed area to the packet transmission/reception allowed area.

Figure 8:
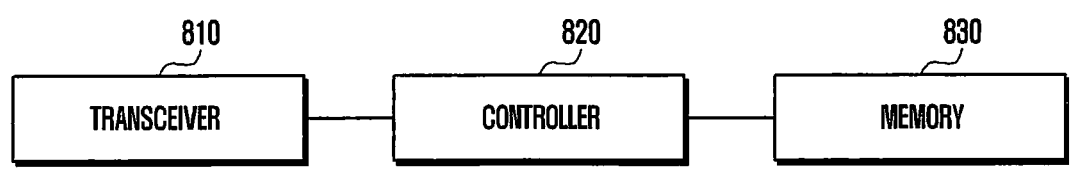
FIG. 8 is a diagram showing a configuration of an SMF according to an embodiment of the disclosure.

FIG. 8 is a diagram showing a configuration of an SMF according to an embodiment of the disclosure.

Referring to FIG. 8, the SMF may include a transceiver 810, a controller 820, and a storage 830.

The transceiver 810 may transmit/receive a signal to/from a terminal (UE), a base station (RAN), and other network entities, and include a communication interface. For example, the transceiver 810 may receive, from the AMF, information indicating that the terminal has entered the packet transmission/reception non-allowed area, or a message indicating a change of the session status.

The controller 820 may control the overall operations of the SMF and particularly control the SMF to perform the above-described operations of embodiments. For example, the controller 820 may control a signal flow between blocks to perform the above-described operation of flowchart. In addition, the controller 820 may include at least one processor. The processor may be controlled by a program that includes instructions to perform the methods described in embodiments of the disclosure. The program may be stored in a storage medium, which may include volatile or non-volatile memory. Such memory may be a medium capable of storing data and is not limited to a specific form as long as it can store the instructions.

Specifically, the controller 820 may receive, from the AMF, information that the terminal moves to the packet transmission/reception non-allowed area, or information that the terminal moves to the packet transmission/reception allowed area. Also, the controller 820 may receive a message that instructs a change of the session status.

Therefore, the controller 820 may change the session status of the terminal, based on the message received from the message. When the terminal has moved to the packet transmission/reception non-allowed area, the SMF may change the session status to the released state, the deactivated state, or the transmission/reception unreachable state with the session maintained.

When the session status is changed to the transmission/reception unreachable state and when a packet is received, the controller 820 may perform a predetermined operation according to an operator policy, such as buffering or dropping the packet.

In case of dropping the packet, an appropriate action may be taken to prevent retransmission of additional packets. For example, the controller 820 may transmit an ICMP message to a packet sender so as to prevent further packet transmission.

Besides, the controller 820 may control all operations of the SMF described in the disclosure.

The storage 830 may store information transmitted or received by the SMF and information generated by the controller 820 according to embodiments of the disclosure. For example, the storage 830 may store information on the changed session status for each session.

Although the disclosure is described using a case where the terminal moves to the packet transmission/reception non-allowed area, embodiments of the disclosure are not limited to the described case. The controller 820 may also similarly operate in another case where the terminal moves from the packet transmission/reception non-allowed area to the packet transmission/reception allowed area.

Meanwhile, the order of steps in the drawings illustrating the methods of the disclosure does not necessarily correspond to the order of execution, and may be reversed or executed in parallel.

In addition, the drawings describing the methods of the disclosure may include only some steps with the others omitted without impairing the subject matter of the disclosure.

Furthermore, the methods of the disclosure may be executed in combination with some or all of the contents included in each embodiment within the scope of not hurting the subject matter of the disclosure.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

The invention claimed is:

1. A method performed by an access and mobility management function (AMF) in a communication system, the method comprising:
   receiving, from a terminal, a registration request message;
   transmitting, from the terminal, a registration accept message as a response to the registration request message, the registration accept message including information on a local area data network (LADN) service area, the LADN service area comprising at least one tracking area associated with the terminal;
   determining whether the terminal is in the LADN service area; and
   transmitting, to a session management function (SMF), information indicating whether the terminal is in the LADN service area,
   wherein the information indicates the terminal is in the LADN service area, the information indicates the terminal is out of the LADN service area, or the information indicates it is not possible to determine whether the terminal is in the LADN service area.

2. The method of claim 1,
   wherein a user plane connection for a protocol data unit (PDU) session associated with the terminal is deactivated, in case that the terminal is out of the LADN service area.

3. The method of claim 1,
   wherein updated information on the LADN service area is transmitted to the terminal based on a registration procedure, in case that the information on the LADN service area is updated.

4. A method performed by a session management function (SMF) in a communication system, the method comprising:
   receiving, from an access and mobility management function (AMF), information indicating whether a terminal is in a local area data network (LADN) service area, wherein the information indicates the terminal is in the LADN service area, the information indicates the terminal is out of the LADN service area, or the information indicates it is not possible to determine whether the terminal is in the LADN service area;
   identifying whether the terminal is in the LADN service area based on the information; and
   transmitting, to a user plane function (UPF), a control message indicating to discard downlink data associated with a protocol data unit (PDU) session corresponding to the LADN service area, in case that the terminal is out of the LADN service area.

5. The method of claim 4, wherein the LADN service area comprises at least one tracking area associated with the terminal.

6. The method of claim 4, wherein a user plane connection for the PDU session is deactivated, in case that the terminal is out of the LADN service area.

7. An access and mobility management function (AMF) in a communication system, the AMF comprising:
   a transceiver; and
   a controller configured to:
   receive, from a terminal by the transceiver, a registration request message,
   transmit, from the terminal by the transceiver, a registration accept message as a response to the registration request message, the registration accept message including information on a local area data network (LADN) service area, the LADN service area comprising at least one tracking area associated with the terminal,
   determine whether the terminal is in the LADN service area, and
   transmit, to a session management function (SMF) by the transceiver, information indicating whether the terminal is in the LADN service area,
   wherein the information indicates the terminal is in the LADN service area, the information indicates the terminal is out of the LADN service area, or the information indicates it is not possible to determine whether the terminal is in the LADN service area.

8. The AMF of claim 7,
   wherein a user plane connection for a protocol data unit (PDU) session associated with the terminal is deactivated, in case that the terminal is out of the LADN service area.

9. The AMF of claim 7,
   wherein updated information on the LADN service area is transmitted to the terminal based on a registration procedure, in case that the information on the LADN service area is updated.

10. A session management function (SMF) in a communication system, the SMF comprising:
    a transceiver; and
    a controller configured to:
    receive, from an access and mobility management function (AMF) by the transceiver, information indicating whether a terminal is in a local area data network (LADN) service area, wherein the information indicates the terminal is in the LADN service area, the information indicates the terminal is out of the LADN service area, or the information indicates it is not possible to determine whether the terminal is in the LADN service area,
    identify whether the terminal is in the LADN service area based on the information, and
    transmit, to a user plane function (UPF) by the transceiver, a control message indicating to discard downlink data associated with a protocol data unit (PDU) session corresponding to the LADN service area, in case that the terminal is out of the LADN service area.

11. The SMF of claim 10, wherein the LADN service area comprises at least one tracking area associated with the terminal.

12. The SMF of claim 10, wherein a user plane connection for the PDU session is deactivated in case that the terminal is out of the LADN service area.

* * * * *